US012144764B2

(12) United States Patent
Herbert

(10) Patent No.: US 12,144,764 B2
(45) **Date of Patent: *Nov. 19, 2024**

(54) BENCH ASSEMBLY FOR STRETCHING THE QUADRICEPS FEMORIS AND/OR HIP FLEXORS MUSCLES

(71) Applicant: Benjamin J. Herbert, Superior Township, MI (US)

(72) Inventor: Benjamin J. Herbert, Superior Township, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,819

(22) Filed: Apr. 28, 2023

(65) Prior Publication Data

US 2023/0263683 A1 Aug. 24, 2023

Related U.S. Application Data

(63) Continuation of application No. 16/717,911, filed on Dec. 17, 2019, now Pat. No. 11,690,772.

(51) Int. Cl.

| | |
|---|---|
| ***A61G 13/00*** | (2006.01) |
| ***A61G 13/10*** | (2006.01) |
| ***A61H 99/00*** | (2006.01) |

(52) U.S. Cl.
CPC ......... *A61G 13/009* (2013.01); *A61G 13/104* (2013.01); *A61H 99/00* (2013.01);
(Continued)

(58) Field of Classification Search
CPC .... A61G 13/009; A61G 13/10; A61G 13/104; A61G 2200/327; A61G 2200/34; A61G 13/105; A61H 1/0237; A61H 1/0244; A61H 99/00; A61H 2201/0161; A61H 2201/1253; A61H 2201/164; A61H 2203/0443; A61H 2203/0456; A61H 2205/088; A61H 2205/108; A47C 9/002; A47C 11/00;
(Continued)

(56) References Cited

U.S. PATENT DOCUMENTS

| | | | |
|---|---|---|---|
| D147,414 S | 9/1947 | Maynard et al. |
| D164,528 S | 9/1951 | Voigt |

(Continued)

FOREIGN PATENT DOCUMENTS

| | | |
|---|---|---|
| BR | 102017012651 | 1/2019 |
| KR | 100500568 B1 | 7/2005 |
| KR | 20090099497 | 9/2009 |

*Primary Examiner* — Tu A Vo
*Assistant Examiner* — Alexander Morales
(74) *Attorney, Agent, or Firm* — UB Greensfelder LLP; Benjamin D. Rotman

(57) ABSTRACT

A bench assembly that stretches and develops the quadriceps femoris and/or hip flexors muscle groups of a client with the help of a therapist or trainer. The bench assembly has a basal subassembly with a front member that faces the therapist. Extending rearwardly from the front member is a first side member. A rear member extends laterally from the first side member. Each of the front and rear members have an upwardly oriented column that extends from a bottom rail of the associated member. The columns underlie a client support pad on which the client may lie recumbent and face upwardly with his/her legs positioned towards the front member before a trainer applies a stretching regimen to the legs and/or hips.

17 Claims, 6 Drawing Sheets

(52) U.S. Cl.
CPC .... *A61G 2200/327* (2013.01); *A61G 2200/34* (2013.01); *A61H 2205/088* (2013.01); *A61H 2205/108* (2013.01)

(58) Field of Classification Search
CPC . A47C 12/00; A63B 21/078; A63B 21/00047; A63B 21/4029; A63B 21/4031; A63B 23/12
USPC ............ 482/142, 148, 901, 907; 601/23–24; 606/237
See application file for complete search history.

(56) References Cited

U.S. PATENT DOCUMENTS

D202,625 S 10/1965 Beckman
3,744,845 A * 7/1973 Sooker ................... A47C 13/00 108/150
3,896,798 A * 7/1975 Simon .................. A61H 1/0229 606/241
D252,388 S 7/1979 Fjellø-Jensen
D293,181 S * 12/1987 Solaro ......................... D6/691.1
4,973,050 A * 11/1990 Santoro ............ A63B 21/00181 482/99
5,261,868 A 11/1993 Prior, Jr. et al.
5,279,530 A 1/1994 Hess
5,306,220 A 4/1994 Kearney
5,354,251 A 10/1994 Sleamaker
5,372,556 A 12/1994 Ropp
5,465,744 A * 11/1995 Browning .............. A61G 7/053 5/81.1 R
5,472,401 A 12/1995 Rouillard et al.
5,496,242 A * 3/1996 Wang ................. A63B 21/4047 482/137
5,913,759 A 6/1999 Boström
5,954,620 A 9/1999 Albritton
5,974,979 A 11/1999 Grady et al.
6,319,177 B1 * 11/2001 Levine ................... A63B 22/18 482/142
6,454,683 B1 * 9/2002 Kaye .................. A63B 71/0036 482/904
6,571,915 B1 * 6/2003 de la Tour .............. E06C 1/393 297/DIG. 10
6,988,979 B1 1/2006 Trainor
7,226,400 B1 * 6/2007 Gedeon-Janvier ........................... A63B 21/4031 482/106
7,294,097 B2 11/2007 Parker
7,534,200 B1 5/2009 Martinez
8,568,281 B2 10/2013 Beaulieu et al.
9,265,987 B2 * 2/2016 Richard ............. A63B 21/0628
9,295,871 B2 3/2016 Luedeka
9,868,025 B2 1/2018 Cygan et al.
D891,160 S * 7/2020 Karlsson ................... D6/656.16
10,813,832 B2 * 10/2020 Qiu ......................... A47F 5/103
11,470,975 B2 10/2022 Boyer
11,690,772 B2 * 7/2023 Herbert ................ A61G 13/009 128/845
2003/0158020 A1 * 8/2003 Johnson ............... A63B 21/008 482/112
2005/0155153 A1 * 7/2005 Falwell .................. A61G 7/075 5/648
2006/0267393 A1 11/2006 Benites
2007/0010381 A1 1/2007 Black
2009/0156968 A1 6/2009 Sheradha
2009/0286658 A1 * 11/2009 James .................. A63B 21/078 482/104
2010/0026075 A1 * 2/2010 Zenisek ................... A47C 9/00 297/423.1
2012/0235457 A1 9/2012 Laurita
2017/0332793 A1 11/2017 Caluwaert
2018/0325256 A1 * 11/2018 Hall ..................... A61G 13/105
2019/0125609 A1 5/2019 Mason et al.
2020/0141533 A1 * 5/2020 Booth .................... A61G 13/10

* cited by examiner

BENCH ASSEMBLY FOR STRETCHING THE QUADRICEPS FEMORIS AND/OR HIP FLEXORS MUSCLES

CROSS-REFERENCE TO RELATED APPLICATION

This application is a continuation of U.S. patent application Ser. No. 16/717,911, filed Dec. 17, 2019, incorporated in its entirety herein.

TECHNICAL FIELD

This disclosure relates to a bench assembly for stretching the quadriceps femoris and or hip flexors muscle groups of a client under the direction of a therapist.

BACKGROUND

The quadriceps femoris a group of muscles located in the front of the thigh. The group has four separate muscles: the vastus lateralis, vastus medialis, vastus intermedius, and the rectus femoris. Each of the vastus muscles originates on the femur bone and attaches to the kneecap.

The quadriceps are used for cycling, walking, running and other physical activities, but are prone to such injuries as strains, tears and fractures.

A traditional quadriceps stretch, often called a "runners stretch" stretches only the smaller rectus femoris part of the quadriceps. That represents about 10% of the muscle tissue in the group. Conventional stretching methods tend to omit a significant percentage of the quadriceps muscle mass.

Combined hip and knee extension exercises (like the squat) are likely to be necessary for full quadriceps development.

SUMMARY

Against this background, a need has developed for suitable equipment each which efficiently and safely enables a trainer to apply suitable therapy to a client's quads and hip flexors.

Following is a simplified overview of representative embodiments and implementations. Its primary purpose is to convey a basic understanding of the subject matter for which patent protection is sought. This summary is not a detailed description of all contemplated embodiments. Nor is it intended to convey all key or critical elements of all inventive features or aspects.

To meet the shortcomings of conventional stretching methods described above, in one embodiment a bench assembly is provided that stretches and develops the quadriceps femoris and/or hip flexors muscle groups of a client with the help of a therapist or trainer.

The bench assembly has a basal subassembly with a front member that faces the therapist. Extending rearwardly from the front member is a first side member. A rear member extends laterally from the first side member.

Each of the front and rear members have an upwardly oriented column that extends from a bottom rail of the associated member. The columns underlie a client support pad on which the client may lie recumbent and face upwardly with his/her legs positioned towards the front member.

The client support pad has a front edge that faces the therapist. That edge is a knee-hinge edge which is adapted to receive the back of the client's knee.

In use, the therapist bends and holds a lower leg rearwardly underneath the client support pad on one side of the column according to a stretching regimen. Thereafter that leg is released and a stretching regimen is applied to the other leg according to the same or another stretching regimen. Benefits include progressive extension of the quads.

Optionally, while the client is lying recumbent, a hip flexure regimen is applied to either or both of the client's hips.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
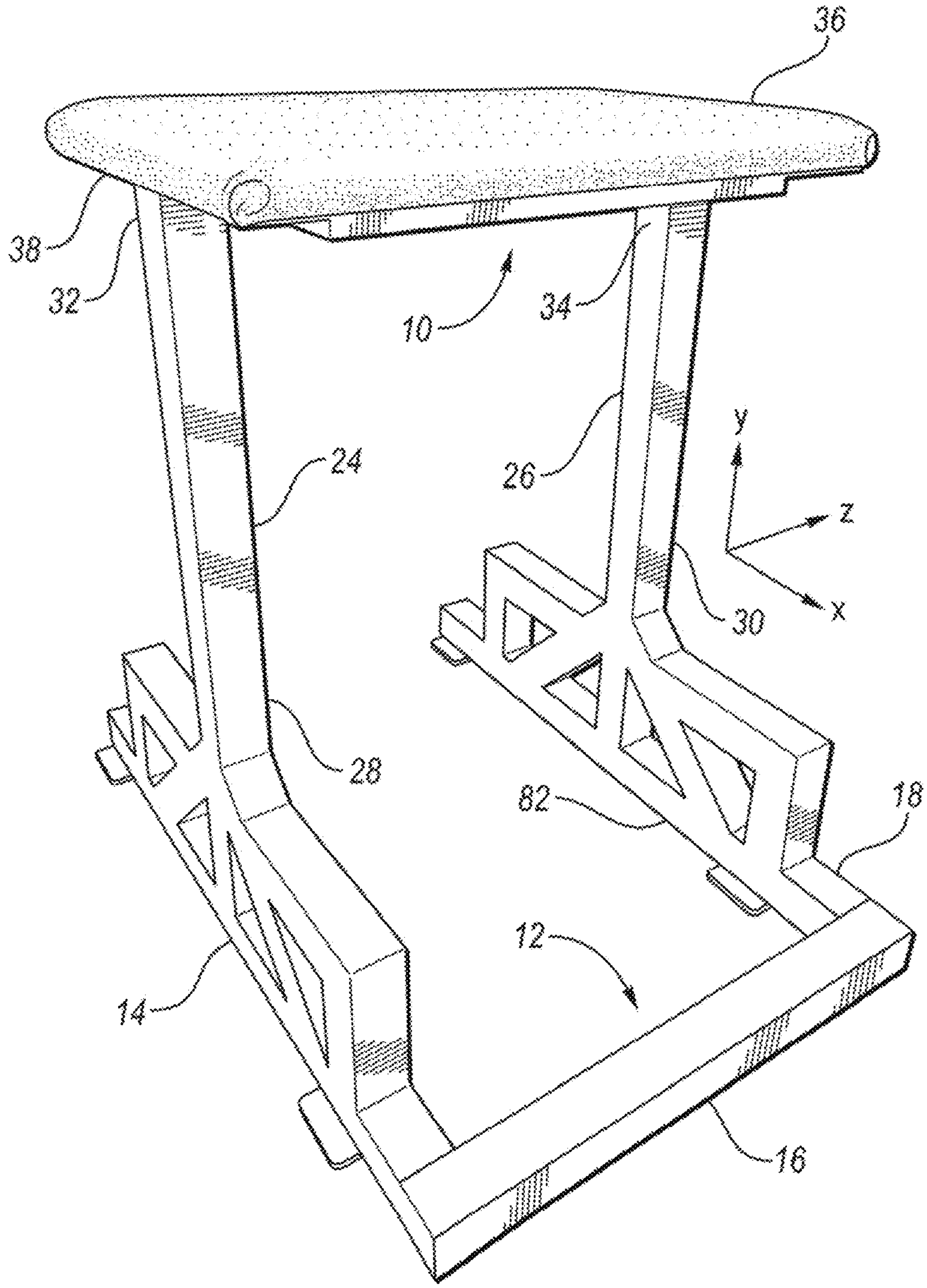
FIG. 1 is a quartering perspective view of a bench assembly according to the present disclosure.

FIG. 1 shows a representative embodiment of a bench assembly 10 according to this disclosure. For reference, the bench assembly is shown with three mutually orthogonal directions, forming a three-dimensional frame of reference.

A longitudinal direction corresponds to the "Z-axis". This axis is oriented perpendicularly to a vertical XY-plane. Another direction, referenced as "transverse", is perpendicular to the Z axis. This transverse direction is also referred to as "X-axis". A respective XZ-plane is formed by the X and Z axes. It is considered to be horizontal and is the plane in which a client's upper torso and thighs may lie recumbent. The XZ-plane corresponds to a top view of the bench assembly.

A third direction is oriented vertically to XZ plane and is referred to as the "Y-axis". A respective YZ plane is formed by the Y and Z axes. Together, the YZ plane is the plane in which a trainer moves the lower legs of a client who is recumbent on the bench assembly.

Figure 2:
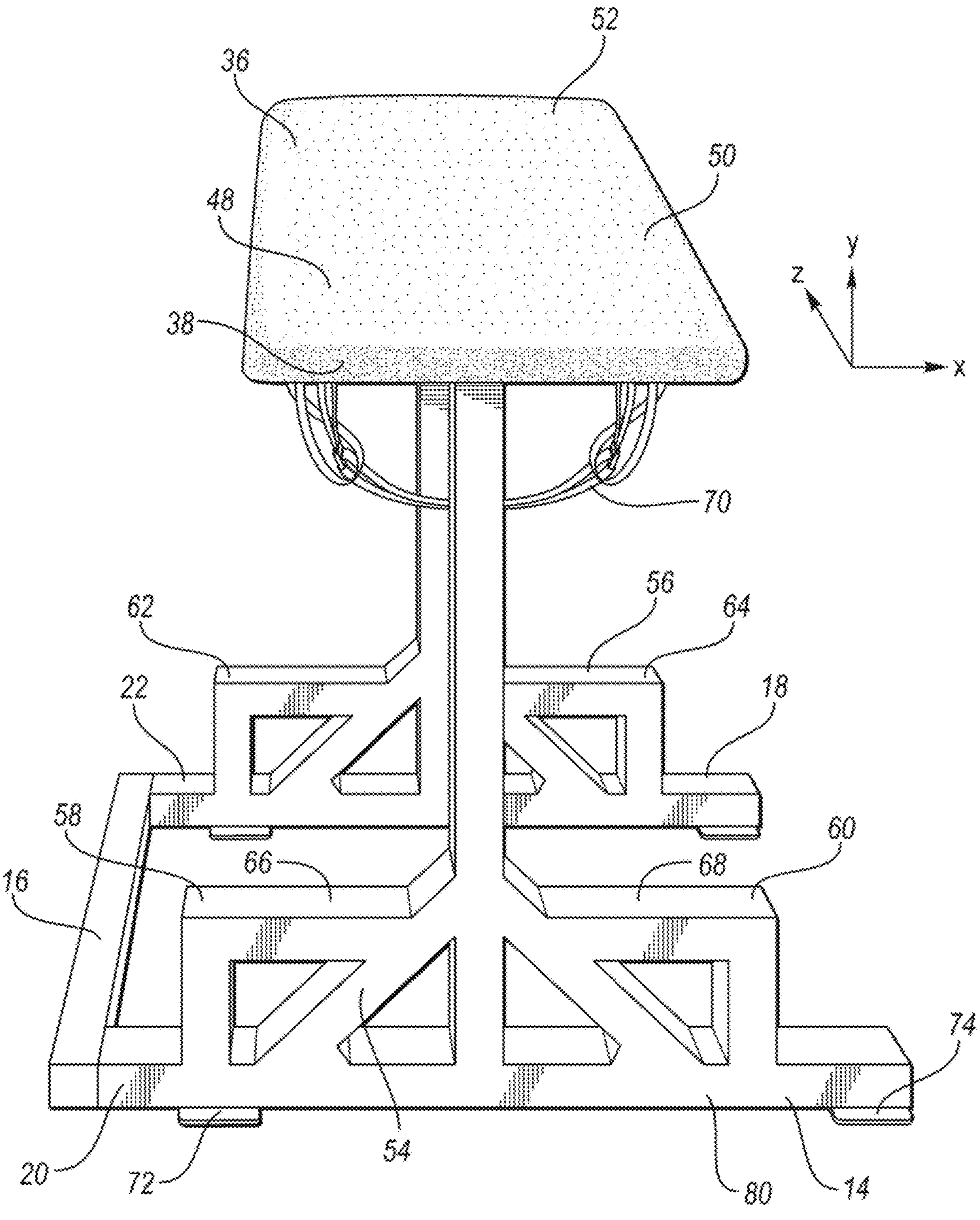
FIG. 2 is a perspective view from a vantage point that is above and in front of an embodiment of the bench assembly.

Turning first to FIGS. 1-2, the bench assembly 10 has a basal subassembly 12 with a front member 14 that that lies in the XY plane and faces the therapist. Extending rearwardly from the front member in the YZ plane is a first side member 16. A rear member 18 extends laterally from the first side member 16 in the XY plane.

Each of the front and rear members 14, 18 have an upwardly oriented column 24, 26 in the Y direction that extends from a bottom rail 20,22 of the associated member. The columns 24,26 underlie a client support pad 36 that lies in the XZ plane on which the client may lie recumbent and face upwardly with his/her legs positioned towards the front member 14.

The client support pad 36 has a front edge 38 that faces the therapist. That edge is a knee-hinge edge in the XZ plane which is adapted to receive the back of the client's knee.

Figure 3:
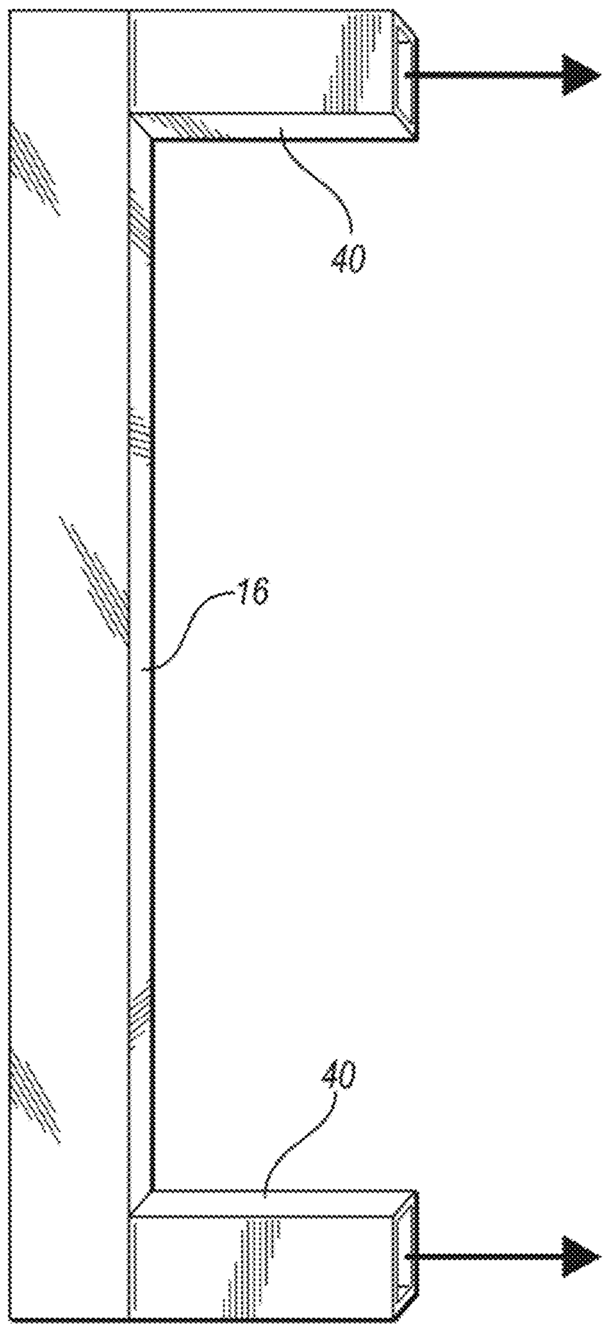
FIG. 3 is a perspective view of a side member with related basal connecting features extending therefrom.
Figure 6:
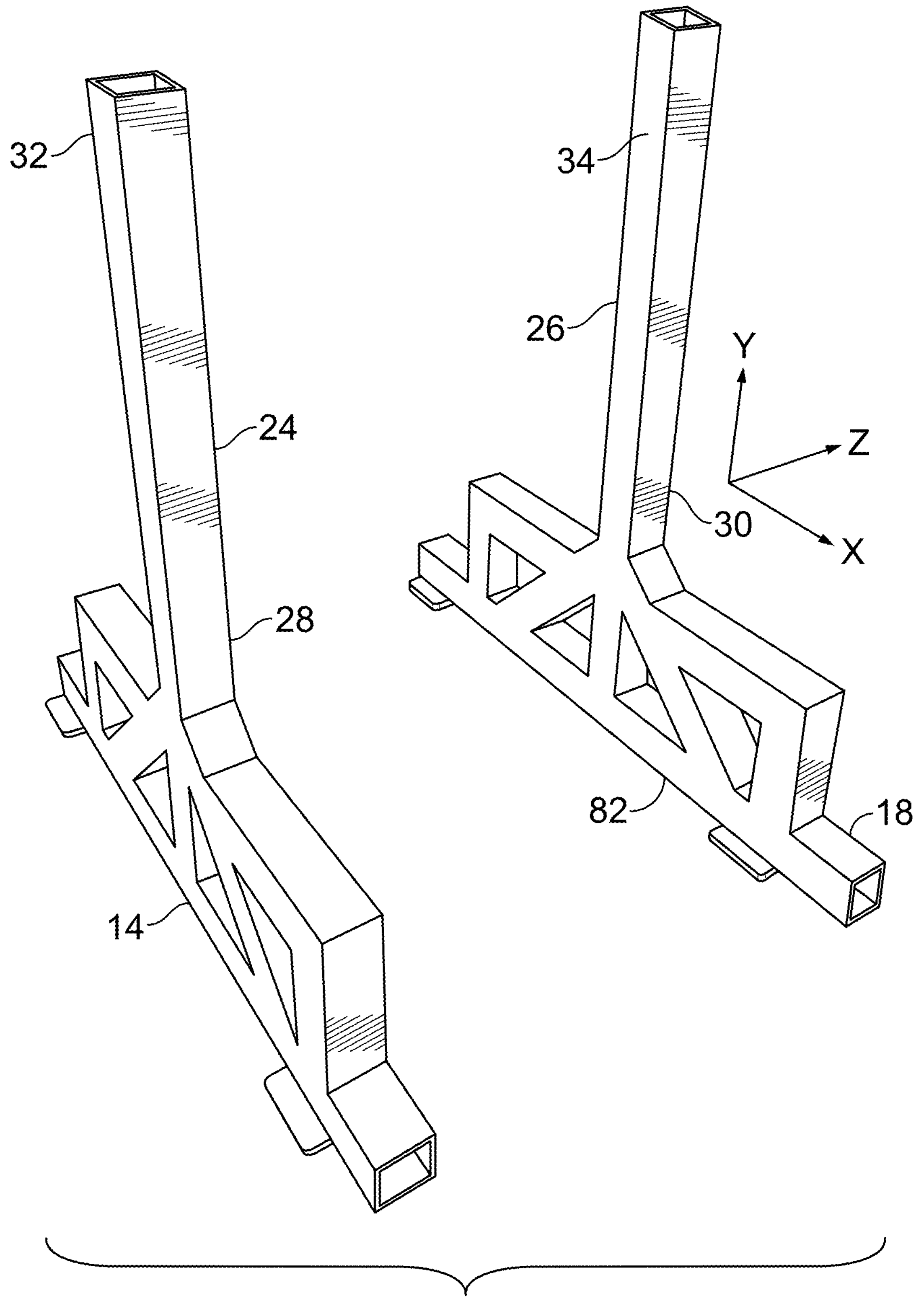
FIG. 6 is a perspective view of a bench assembly with the client support pad removed according to the present disclosure.

In most embodiments, the bench assembly 10 has a basal subassembly 12 that is tubular (FIG. 6). Usually, the first side member 16 (FIG. 3) has a basal connecting feature 40 that extends towards and telescopingly engages an associated front or rear member 14,18. Preferably, the upwardly oriented columns 24, 26 are also tubular. It should be understood by one of skill in the art that the term tubular refers to hollowed elongated members having any cross-section.

Advantageously, the client support pad 36 has a lower surface 42 and a pad connecting feature 44,46 (FIG. 4) that extends downwardly therefrom. The pad connecting feature 44,46 telescopingly engages the top portion 32,34 of an associated column 24,26.

Figure 4:
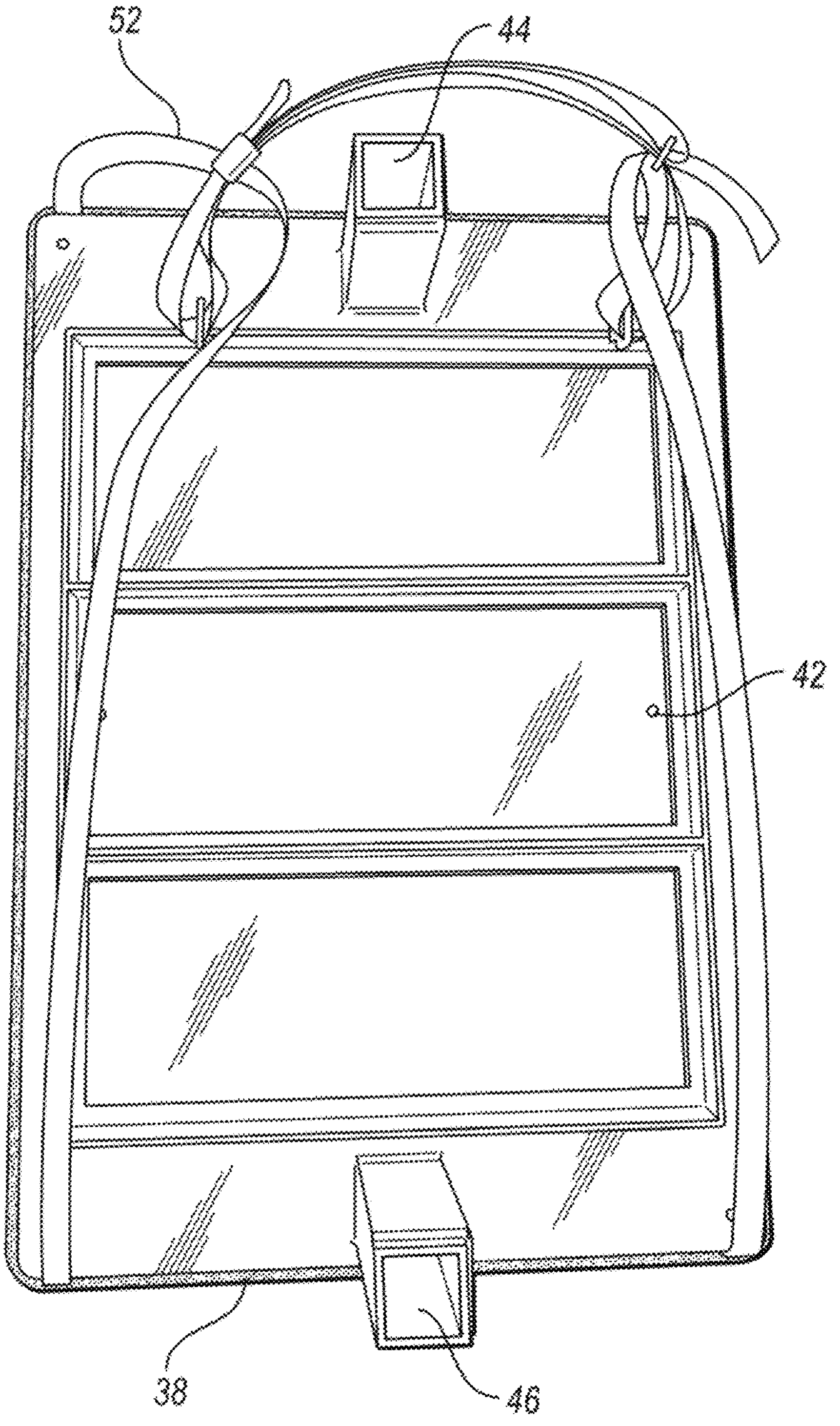
FIG. 4 is a view of the underside of the client support pad with related pad support features extending downwardly therefrom.
Figure 5:
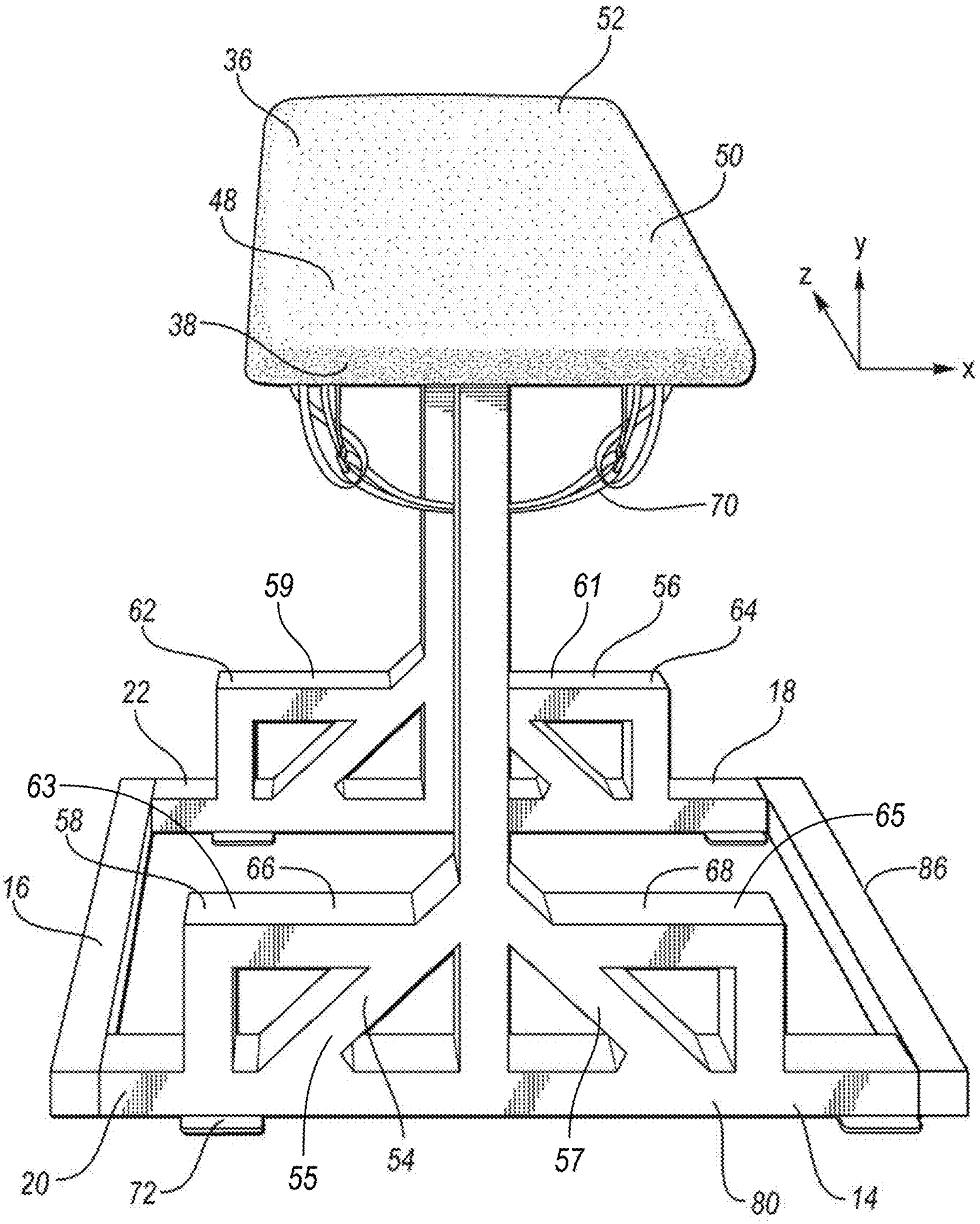
FIG. 5 is a perspective view from a vantage point that is above and in front of an embodiment of the bench assembly.

Referring to FIGS. 1,2 and 4, the client support pad 36 has a pair of lateral side edges 48,50 that extend rearwardly from the knee-hinge edge 38. The pad connecting features 40 extend downwardly from the knee-hinge edge 38 and a rear edge 52 for receiving the columns 24,26.

In alternative embodiments, the bench assembly 10 is formed from welded, brazed or otherwise joined components and is thus monolithic. Preferably, the bench assembly has component parts including the basal subassembly 12, the front and rear members 14,18, the first side member 16 and the client support pad 36 that can readily be assembled for client and therapist use and disassembled for portability.

The bench assembly of claim 1, wherein the front and rear members 14,18 each have a brace 54,56 (FIGS. 1-2) extending above the bottom rail 28,30 that supports an associated column 24,26 to promote stability of the bench assembly.

In some embodiments, the bench assembly 10 has front and rear members 14,18 that are provided with a pair of upper shoulders 58,60,62,64 (FIG. 2). Each shoulder may provide for a leverage surface 59, 61, 63, 65 used by a therapist to apply body weight and in turn, leverage said body weight onto the patient in providing therapy. In some embodiments, the brace further comprises a diagonal member 55, 57 to provide additional stability to the brace and assembly. In such cases, an anti-slip surface 66, 68 is mounted on at least some of the upper shoulders or leverage surfaces to facilitate safe mounting of the client on the bench assembly and dismounting therefrom and to prevent the therapist from slipping while utilizing the leverage surface 59, 61, 63, 65 to provide therapy.

Referring to FIGS. 2, 4 the bench assembly 10 further includes one or more straps 70 mounted to an underside of the client support pad 36 to facilitate transport thereof.

Alternative embodiments include flanges 72,74,76,78 projecting from a lower surface 80,82 of the bottom rails of the front and rear members 14,18 for added stability and to provide a means for securing the bench assembly to a flooring surface on which the bench assembly 10 is positioned.

Preferably, tubular front and rear basal members 14,18 the first side member 16 and the columns 24,26 have a quadrilateral cross-section.

Optionally, the bench assembly 10 further comprises a second side member (not shown) that extends between the front and rear members 14,18 for added stability.

This disclosure also includes a method of assembling a bench assembly as described above. The assembly steps include:

- providing a basal subassembly with front and rear members and a first side member extending between the front and rear members;
- mounting on each of the front and rear members an upwardly oriented column; and
- securing a client support pad on which the client may lie recumbent, the client support pad being attached to the upwardly oriented columns, the client support pad having a knee-hinge edge that is adapted to receive the back of the client's knee.

Also included in this disclosure is a method of using the described bench assembly for stretching and/or developing the quadriceps femoris and/or hip flexors muscle groups of a client under the direction of a therapist. The method of use steps include:

- positioning the client on the client support pad in the XZ plane so that the client faces upwardly with his/her legs positioned towards the front member;

- moving in the YZ plane a lower leg of the client rearwardly on one side of a column according to a stretching regimen; and
- moving parallel to the YZ plane the other lower leg rearwardly on another side of the column according to a stretching regimen.

Representative stretching regimens of the quad extension and hip flexor movements will now be described.

Proper Position to Begin the Quad/Hip Flexor Stretch

The client climbs onto the bench assembly. The client sits in an upright position and slides his/her (hereinafter "his") glutes to the front edge of the pad facing the trainer. Once the glutes are on the front edge of the pad with his legs hanging down in a relaxed position, the client will lay his upper body back and relax on the supporting pad.

In the description below, it is assumed that the first leg to be stretched/strengthened is the right leg. But it will be appreciated that the invention is not so limited.

Right Leg

1.) The client will grab his left knee with both hands and pull it into his chest as tightly as possible.

2.) The client will support his left foot on the right shoulder of the trainer. The trainer will apply downward pressure to the right thigh of the client with the left hand or left forearm of the trainer, while simultaneously applying pressure to the right shin of the client with the left knee of the trainer. Depending on the client, this position will be held for about 30-45 seconds.

3.) The client will be asked to aggressively lift his right knee up against the left hand or forearm of the trainer, while the trainer applies downward pressure into the right thigh of the client. This will create an isometric contraction of the right hip flexor that will be held for about 7 seconds. After the 7 second isometric contraction, the client will be asked to relax his right leg and continue to breathe.

4.) The trainer will continue to apply downward pressure to the right thigh of the client with the left hand or forearm of the trainer, while simultaneously applying pressure to the right shin of the client with the left knee of the trainer. Depending on the client, his position will be held for about for 10-20 seconds.

5.) The client will be asked to aggressively extend his right shin against the left knee of the trainer, while the trainer applies pressure back into the right shin of the client. This will create an isometric contraction of the right quadriceps and will be held for about 7 seconds. After the 7 second isometric contraction, the client will be asked to relax his right leg and continue to breathe.

6.) While applying downward pressure to the thigh of the client, the trainer will encourage the client to relax as the trainer airs out (moves it back and forth) the lower limb about 4-5 times. Once the airing out is complete, the right side has been fully stretched.

Left Leg

1.) The client will grab his right knee with both hands and pull it into his chest as tightly as possible.

2.) The client will support his right foot on the left shoulder of the trainer. The trainer will apply downward pressure to the left thigh of the client with the right hand or right forearm of the trainer, while simultaneously applying pressure to the left shin of the client with the right knee of the trainer Depending on the client, this position will be held for about 30-45 seconds.

2.) Apply downward pressure to the left thigh of the client with the right hand or forearm of the trainer, while simultaneously applying pressure to the left shin of the client with the right knee of the trainer. Hold this position for 30-45 seconds.

3.) The client will be asked to aggressively lift his left knee up against the right hand or forearm of the trainer, while the trainer applies downward pressure into the left thigh of the client. This will create an isometric contraction of the left hip flexor that will be held for about 7 seconds. After the 7 second isometric contraction, relax the left leg and continue to breathe.

4.) The trainer will continue to apply downward pressure to the left thigh of the client with the right hand or forearm of the trainer, while simultaneously applying pressure to the left shin of the client with the right knee of the trainer. Depending on the client, his position will be held for about 10-20 seconds.

5.) The client will be asked to aggressively extend his left shin against the right knee of the trainer, while the trainer applies pressure back into the left shin of the client. This will create an isometric contraction of the left quadriceps and will be held for about 7 seconds. After the 7 second isometric contraction, the client will be asked to relax the left leg and continue to breathe.

6.) While applying downward pressure to the left thigh of the client, the trainer will encourage the client to relax as the trainer airs out (moves it back and forth) the lower limb about 4-5 times. Once this airing out is complete, the left side has been fully stretched.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

TABLE OF REFERENCE NUMBERS

| Reference No. | Component |
|---|---|
| 10 | bench assembly |
| 12 | basal subassembly |

-continued

TABLE OF REFERENCE NUMBERS

| Reference No. | Component |
|---|---|
| 14 | front member |
| 16 | first side member |
| 18 | rear member |
| 20, 22 | bottom rail |
| 24, 26 | upwardly oriented column |
| 28, 30 | bottom portion |
| 32, 34 | top portion |
| 36 | client support pad |
| 38 | knee-hinge edge |
| 40 | basal connecting feature |
| 42 | lower surface |
| 44, 46 | pad connecting feature |
| 48 | lateral side edges |
| 50 | lateral side edges |
| 52 | rear edge |
| 54, 56 | brace |
| 55, 57 | diagonal numbers |
| 58, 60, 62, 64 | upper shoulders |
| 59, 61, 63, 65 | leverage surface |
| 66, 68 | anti-slip surface |
| 70 | strap |
| 72, 74, 76, 78 | pair of flanges |
| 80, 82 | lower surface |
| 86 | second side member |

What is claimed is:

1. A bench assembly for stretching a client by a therapist, the bench assembly comprising:

a basal subassembly including:

a front member that is configured to face the therapist, a first side member that extends rearwardly from the front member; and a rear member that extends laterally from the first side member, each of the front and rear members having a bottom rail and an upwardly oriented column coupled to and extending from each bottom rail, the upwardly oriented column having a bottom portion disposed at the bottom rail and a top portion at a distal end, further, at least one of the front and rear members having at least one brace extending above the bottom rail supporting the upwardly oriented column, the at least one brace comprising an a upper shoulder member having a leverage surface extending from and normal to the upwardly oriented column and a vertical member extending from and normal to the leverage surface coupled to the bottom rail, the at least one brace further comprises a diagonal member extending from the bottom rail to the upwardly oriented column, the diagonal member having an upper portion intersecting with the upwardly oriented column and a bottom portion intersecting with the bottom rail, the diagonal member positioned between the upwardly oriented column and an intersection of the vertical member and the bottom rail, the upper portion of the diagonal member is positioned between the upper shoulder member and the upwardly oriented column, and the upper shoulder member intersects with the diagonal member;

a client support pad coupled to the upwardly oriented columns of the front member and rear member, the client support pad having a knee-hinge edge that is adapted to receive a back of the client's knee.

2. The bench assembly of claim 1, wherein the asal front member, first side member, or the rear member is tubular.

3. The bench assembly of claim 2, wherein the first side member has a basal connecting feature that extends towards and telescopingly engages an associated front or rear member.

4. The bench assembly of claim 1, wherein the upwardly oriented columns are tubular.

5. The bench assembly of claim 4, wherein the tubular upwardly oriented columns have a quadrilateral cross section.

6. The bench assembly of claim 1, wherein the client support pad has a lower surface and a pad connecting feature that extends downwardly therefrom.

7. The bench assembly of claim 6, wherein the pad connecting feature telescopingly engages the top portion of an at least one upwardly oriented column.

8. The bench assembly of claim 1, wherein the client support pad has a pair of lateral side edges that extend rearwardly from the knee-hinge edge.

9. The bench assembly of claim 8, wherein pad connecting features extend downwardly from the knee-hinge edge and a client support pad rear edge for receiving the top portions of the upwardly oriented columns.

10. The bench assembly of claim 1, wherein the bench assembly is monolithic.

11. The bench assembly of claim 1, wherein the the front and rear members are removably coupled to the first side member and the client support pad is remvoably coupled to the upwardly oriented columns.

12. The bench assembly of claim 1, further including an anti-slip surface mounted on at least a portion of the leverage surface.

13. The bench assembly of claim 1, further including one or more straps mounted to an underside of the client support pad to facilitate transport thereof.

14. The bench assembly of claim 1, further including a pair of flanges projecting from a lower surface of the bottom rails of the front and rear members for added stability and to provide a means for securing the bench assembly to a flooring surface on which the bench assembly is positioned.

15. The bench assembly of claim 1, further comprising a second side member that extends between the front and rear members opposite the first side member.

16. A method of assembling the bench assembly of claim 1 comprising the steps of:

providing the basal subassembly with front and rear members and the first side member extending between the front and rear members;

mounting on each of the front and rear members an upwardly oriented column;

securing a client support pad, the client support pad being attached to the upwardly oriented columns, the client support pad having a knee-hinge edge that is adapted to receive the back of the client's knee.

17. A method of using a bench assembly for stretching the quadriceps femoris and/or hip flexors muscle groups of a client under the direction of a therapist, the bench assembly comprising:

a basal subassembly with a front member that is configured to face the therapist, a first side member that extends rearwardly from the front member; and a rear member that extends laterally from the first side member, each of the front and rear members having a bottom rail and an upwardly oriented column extending coupled to and extending from each bottom rail, each upwardly oriented column having a bottom portion disposed at each bottom rail and a top portion at a distal end, further, at least one of the front and rear members having a brace extending above the bottom rail supporting the upwardly oriented column, wherein the brace comprises an a upper shoulder member having a leverage surface extending from and normal to the upwardly oriented column and a vertical member extending from and normal to the leverage surface coupled to the bottom rail, the brace further comprises a diagonal member extending from the bottom rail to the upwardly oriented column, the diagonal member having an upper portion intersecting with the upwardly oriented column and a bottom portion intersecting with the bottom rail, the diagonal member positioned between the upwardly oriented column and an intersection of the vertical member and the bottom rail, the upper portion of the diagonal member is positioned between the upper shoulder member and the upwardly oriented column, and the upper shoulder member intersects with the diagonal member;

a client support pad, the client support pad being attached to the top portion of the upwardly oriented columns, the client support pad having a knee-hinge edge that is adapted to receive the back of a client's knee;

the method of using comprising the steps of:

positioning the client on the client support pad so that the client faces upwardly with his/her legs positioned towards the front member, moving a lower leg of the client rearwardly on one side of a column according to a stretching regimen;

positioning a therapist leg upon the leverage surface;

engaging the lower leg of the client the client with the therapist leg, the therapist using the leverage surface to provide additional support for to transfer a force to from the therapist leg to the lower leg of the client, stretching the lower leg of the client;

moving the other lower leg rearwardly on another side of the column according to stretching regimen or a second stretching regimen;

positioning a therapist leg upon the leverage surface; and engaging the other lower leg of the client the client with the therapist leg, the therapist using the leverage surface to provide additional support for to transfer a force to from the therapist leg to the other lower leg of the client stretching the other lower leg of the client.

* * * * *